United States Patent
Park et al.

(10) Patent No.: US 11,005,147 B2
(45) Date of Patent: May 11, 2021

(54) POUCH TYPE SECONDARY BATTERY

(71) Applicant: LG CHEM, LTD., Seoul (KR)

(72) Inventors: Jong Pil Park, Daejeon (KR); Seung Don Choi, Daejeon (KR)

(73) Assignee: LG Chem, Ltd., Seoul (KR)

( * ) Notice: Subject to any disclaimer, the term of this patent is extended or adjusted under 35 U.S.C. 154(b) by 87 days.

(21) Appl. No.: 16/481,273

(22) PCT Filed: Aug. 9, 2018

(86) PCT No.: PCT/KR2018/009136
§ 371 (c)(1),
(2) Date: Jul. 26, 2019

(87) PCT Pub. No.: WO2019/045310
PCT Pub. Date: Mar. 7, 2019

(65) Prior Publication Data
US 2019/0379032 A1    Dec. 12, 2019

(30) Foreign Application Priority Data

Aug. 29, 2017    (KR) .................... 10-2017-0109443

(51) Int. Cl.
*H01M 50/572* (2021.01)
*H01M 50/124* (2021.01)
(Continued)

(52) U.S. Cl.
CPC ....... *H01M 50/572* (2021.01); *H01M 50/124* (2021.01); *H01M 50/172* (2021.01); *H01M 50/531* (2021.01)

(58) Field of Classification Search
CPC .......... H01M 2/34; H01M 10/04; H01M 2/02; H01M 2/26; H01M 8/24; H01M 2/0287;
(Continued)

(56) References Cited

U.S. PATENT DOCUMENTS 6,187,472 B1    2/2001  Shiota et al.
2003/0064286 A1*  4/2003  Yoshida .................. H01M 2/08
                                                                429/184
(Continued)

FOREIGN PATENT DOCUMENTS

JP    H10-294097 A    11/1998
JP    2001-246590 A    9/2001
(Continued)

OTHER PUBLICATIONS

Office Action dated Sep. 7, 2020, issued in corresponding Japanese Patent Application No. 2019-550192. Note: 2011-076776.
(Continued)

*Primary Examiner* — Magali P Slawski
*Assistant Examiner* — Jessie L. Walls
(74) *Attorney, Agent, or Firm* — Morgan, Lewis & Bockius LLP

(57) ABSTRACT

A pouch type secondary battery includes: an electrode assembly having an electrode including a positive electrode and a negative electrode and a separator laminated therein; a battery case having a pouch shape to accommodate the electrode assembly; an electrode tab connected to the electrode and protruding from one side of the electrode; a first electrode lead having one end connected to the electrode tab; a second electrode lead having one end connected to the other end of the first electrode lead and the other end protruding to outside the battery case; and a connection part bonding the first electrode lead to the second electrode lead to connect the first and second electrode leads to each other, wherein a first inclined surface is provided on at least one of the other end of the first electrode lead and the one end of the second electrode lead.

17 Claims, 12 Drawing Sheets

(51) Int. Cl.
*H01M 50/172* (2021.01)
*H01M 50/531* (2021.01)

(58) Field of Classification Search
CPC ........ H01M 2/06; H01M 2/345; B23K 26/32;
B25J 15/00; B25J 15/08
See application file for complete search history.

(56) References Cited

U.S. PATENT DOCUMENTS

| | | | |
|---|---|---|---|
| 2008/0026281 A1 | 1/2008 | Hayashi et al. | |
| 2011/0104520 A1 | 5/2011 | Ahn | |
| 2015/0171411 A1* | 6/2015 | Kobayashi | H01M 2/22 429/61 |
| 2016/0028068 A1 | 1/2016 | Yang et al. | |
| 2017/0125786 A1 | 5/2017 | Park et al. | |
| 2018/0159185 A1 | 6/2018 | Choi et al. | |

FOREIGN PATENT DOCUMENTS

| | | |
|---|---|---|
| JP | 2011-076776 A | 4/2011 |
| JP | 2011-096664 A | 5/2011 |
| JP | 2016-085849 A | 5/2016 |
| KR | 10-2013-0014253 A | 2/2013 |
| KR | 10-2015-0034637 A | 4/2015 |
| KR | 10-2016-0049889 A | 5/2016 |
| KR | 10-2017-0004686 A | 1/2017 |
| KR | 10-1734703 B1 | 5/2017 |
| KR | 10-2018-0091324 A | 8/2018 |

OTHER PUBLICATIONS

International Search Report dated Nov. 15, 2018, issued in corresponding International Application No. PCT/KR2018/009136.
Communication dated Jan. 9, 2020, issued in corresponding Extended European Search Report Application No. 18850290.0. Note: KR 2013-00449889.

* cited by examiner

POUCH TYPE SECONDARY BATTERY

CROSS-REFERENCE TO RELATED APPLICATION

The present application claims the benefit of the priority of Korean Patent Application No. 10-2017-0109443, filed on Aug. 29, 2017, which is hereby incorporated by reference in its entirety.

TECHNICAL FIELD

The present invention relates to a pouch type secondary battery, and more particularly, to a pouch type secondary battery in which, when a gas is generated in a case to increase in pressure, a plurality of electrode leads are reliably attached and detached to secure complete interruption of an electrical connection.

BACKGROUND ART

Batteries (cells) that generate electric energy through physical or chemical reaction to supply the generated electric energy to the outside are used when AC power to be supplied to the building is not obtained, or DC power is required according to the living environments surrounded by various electronic devices.

Among such batteries, primary batteries and secondary batteries, which are chemical cells using chemical reaction, are generally used. The primary batteries are consumable cells which are collectively referred to as dry cells. On the other hand, a secondary battery is a rechargeable battery that is manufactured by using a material in which oxidation and reduction processes between current and a material are capable of being repeated many times.

In general, secondary batteries include nickel-cadmium batteries, nickel-hydrogen batteries, lithium ion batteries, and lithium ion polymer batteries. Such a secondary battery is being applied to and used in small-sized products such as digital cameras, P-DVDs, MP3Ps, mobile phones, PDAs, portable game devices, power tools, E-bikes, and the like as well as large-sized products requiring high power such as electric vehicles and hybrid vehicles, power storage devices for storing surplus power or renewable energy, and backup power storage devices.

A lithium secondary battery is generally formed by laminating a positive electrode (i.e., cathode), a separator, and a negative electrode (i.e., anode). Also, materials of the positive electrode, the separator, and the negative electrode may be selected in consideration of battery lifespan, charging/discharging capacities, temperature characteristics, stability, and the like. The charging and discharging of the lithium secondary battery are performed while lithium ions are intercalated and deintercalated from lithium metal oxide of the positive electrode to a graphite electrode of the negative electrode.

In general, unit cells, each of which has a three-layered structure of a positive electrode/a separator/a negative electrode or a five-layered structure of a positive electrode/a separator/a negative electrode/a separator/a positive electrode or a negative electrode/a separator/a positive electrode/a separator/a negative electrode, are assembled to constitute one electrode assembly. The electrode assembly is accommodated in a specific case.

Such a secondary battery is classified into a pouch type secondary battery and a can type secondary battery according to a material of a case accommodating the electrode assembly. In the pouch type secondary battery, an electrode assembly is accommodated in a pouch made of a flexible polymer material having a variable shape. Also, in the can type secondary battery, an electrode assembly is accommodated in a case made of a metal or plastic material having a predetermined shape.

The secondary battery may be deteriorated in safety due to various problems such as internal short circuit due to an external impact, heat generation due to overcharging and overdischarging, electrolyte decomposition due to the generated heat, and a thermal runaway phenomenon. Particularly, explosion of the secondary battery is caused by various causes. For example, an increase in gas pressure within the secondary battery due to the decomposition of the electrolyte may also act as one cause.

Particularly, when the secondary battery is repeatedly charged and discharged, a gas is generated by electrochemical reaction between the electrolyte and an electrode active material. Here, the generated gas may allow the secondary battery to increase in internal pressure to cause problems such as weakening of bonding force between components, damage of a case of the secondary battery, an early operation of a protection circuit, deformation of an electrode, internal short circuit, explosion, and the like. Thus, in the case of the can type secondary battery, a protection member such as a CID filter and a safety vent is provided to physically interrupt an electrical connection when an internal pressure of a case increases. However, in the case of the pouch type secondary battery according to the related art, the protection member is not sufficiently provided.

In recent years, an electrode lead is provided in plurality. Thus, in the pouch type secondary battery, when the inside of a case is expanded, technologies for physically interrupting an electrical connection such as interruption of connection between the plurality of electrode leads have been proposed. However, in case in which the connection between the plurality of electrode leads is not completely interrupted, although the inside of the case is expanded, electricity may be still be produced from an electrode assembly and then be supplied to the outside. Thus, since current is not completely cut off, there is no guarantee that the above problems are capable of being reliably solved.

DISCLOSURE OF THE INVENTION

Technical Problem

An object of the present invention is to provide a pouch type secondary battery in which, when a gas is generated in a case to increase in pressure, a plurality of electrode leads are reliably attached and detached to secure complete interruption of an electrical connection.

The objects of the present invention are not limited to the aforementioned object, but other objects not described herein will be clearly understood by those skilled in the art from descriptions below.

Technical Solution

To solve the above problem, a pouch type secondary battery according to an embodiment of the present invention includes: an electrode assembly including a positive electrode and a negative electrode and a separator are laminated; a battery case having a pouch shape to accommodate the electrode assembly; an electrode tab connected to the electrode assembly and protruding from one side of the electrode assembly; a first electrode lead having one end connected to the electrode tab; a second electrode lead having one end connected to the other end of the first electrode lead and the other end protruding to the outside of the battery case; and a connection part bonding the first electrode lead to the second electrode lead to connect the first and second electrode leads to each other, wherein a first inclined surface is provided on at least one of the other end of the first electrode lead and the one end of the second electrode lead.

Also, the pouch type secondary battery may further include a step compensation part disposed on a side of the other end of the first electrode lead.

Also, the step compensation part may be provided in plurality.

Also, when the first inclined surface is provided on the other end of the first electrode lead, each of the plurality of step compensation parts may have one end contacting the first inclined surface in a state in which the plurality of step compensation parts are laminated, and the plurality of step compensation parts may increase in length in order of the lamination to correspond to an inclined angle of the first inclined surface.

Also, the step compensation part may be integrally provided.

Also, when the first inclined surface is provided on the other end of the first electrode lead, a second inclined surface may be provided on one end of the step compensation part.

Also, the second inclined surface may correspond to an inclined angle of the first inclined surface.

Also, the second inclined surface may contact the first inclined surface.

Also, the step compensation part may have non-conductivity.

Also, the step compensation part may have a thickness corresponding to the sum of a thickness of the first electrode lead and a thickness of the connection part.

Also, the first inclined surface may have an obtuse angle with respect to a bonding surface on which the first electrode lead and the second electrode lead are bonded to each other through the connection part.

Also, the pouch type secondary battery may further include an insulation part surrounding a portion of each of the first and second electrode leads to allow the first and second electrode leads to be bonded to the battery case.

Also, bonding force between each of the first and second electrode leads and the connection part may be less than that between each of the first and second electrode leads and the insulation part.

Also, the insulation part may surround a portion at which the first and second electrode leads are connected to each other through the connection part.

Also, the insulation part may be made of at least one of thermoplastic, thermosetting and photocurable resins having electrical insulation properties.

Also, the connection part may be made of a conductive polymer including a conductive material.

Also, the connection part may have a thickness of 1 μm to 500 μm.

Particularities of other embodiments are included in the detailed description and drawings.

Advantageous Effects

The embodiments of the present invention may have at least the following effects.

Since the first inclined surface is formed on at least one of the other end of the first electrode lead and one end of the second electrode lead, the first and second electrode leads may be reliably detached to secure the complete interruption of the electrical connection.

In addition, the step compensation part may be disposed on the side of the other end of the first electrode lead to reduce the height of the stepped portion, thereby preventing the bonding force between the insulation part and the electrode lead from decreasing without increasing in number of processes.

The effects of the prevent invention are not limited by the aforementioned description, and thus, more varied effects are involved in this specification.

MODE FOR CARRYING OUT THE INVENTION

Figure 1:
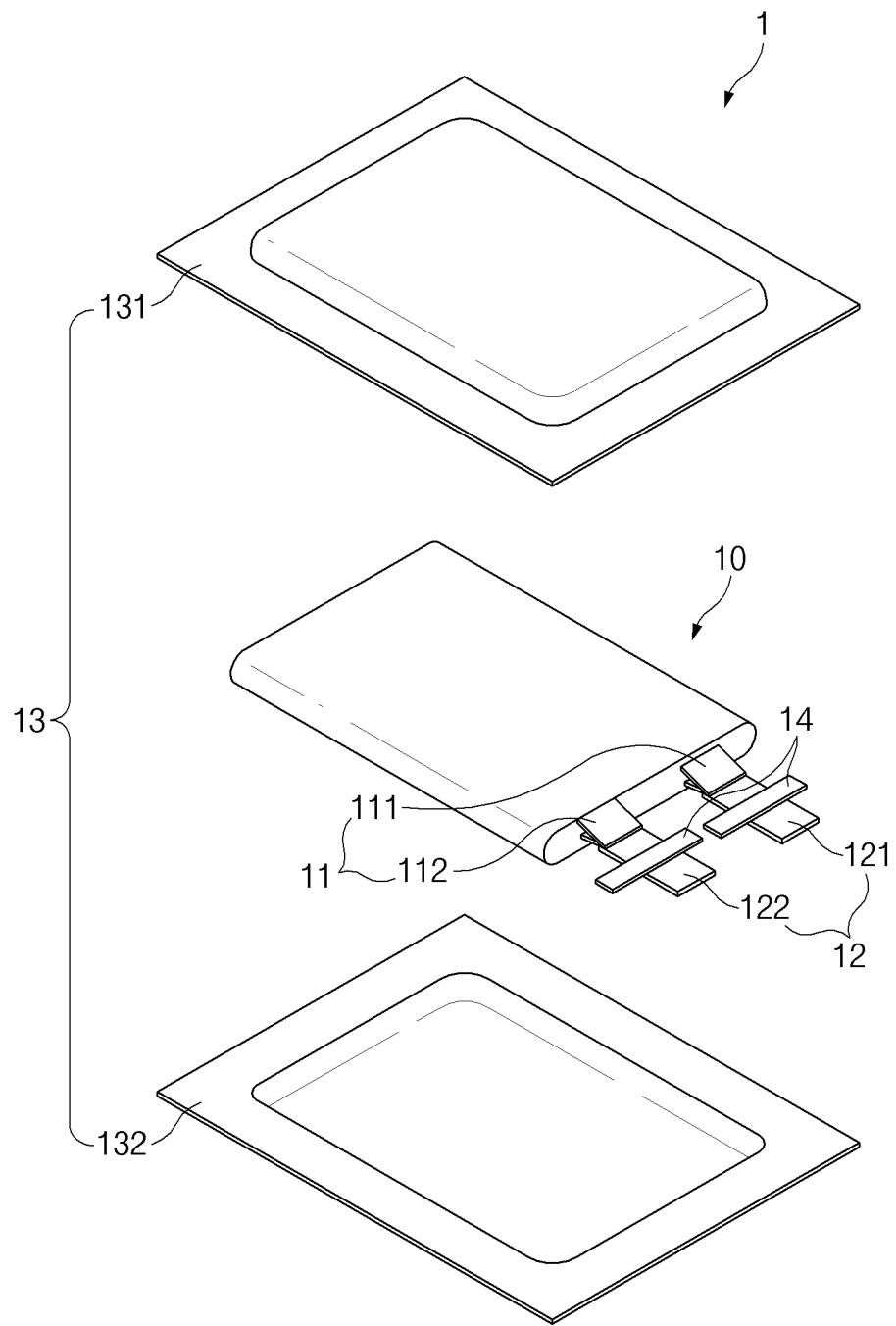
FIG. 1 is an assembled view of a pouch type secondary battery according to an embodiment of the present invention.

Advantages and features of the present disclosure, and implementation methods thereof will be clarified through following embodiments described with reference to the accompanying drawings. The present invention may, however be embodied in different forms and should not be construed as limited to the embodiments set forth herein. Rather, these embodiments are provided so that this disclosure will be thorough and complete, and will fully convey the scope of the present invention to those skilled in the art.

Further, the present invention is only defined by scopes of claims. Like reference numerals refer to like elements throughout.

Unless terms used in the present invention are defined differently, all terms (including technical and scientific terms) used herein have the same meaning as generally understood by those skilled in the art. Also, unless defined clearly and apparently in the description, the terms as defined in a commonly used dictionary are not ideally or excessively construed as having formal meaning.

In the following description, the technical terms are used only for explaining a specific exemplary embodiment while not limiting the inventive concept. In this specification, the terms of a singular form may comprise plural forms unless specifically mentioned. The meaning of 'comprises" and/or "comprising' does not exclude other components besides a mentioned component.

Hereinafter, preferred embodiments will be described in detail with reference to the accompanying drawings.

Figure 2:
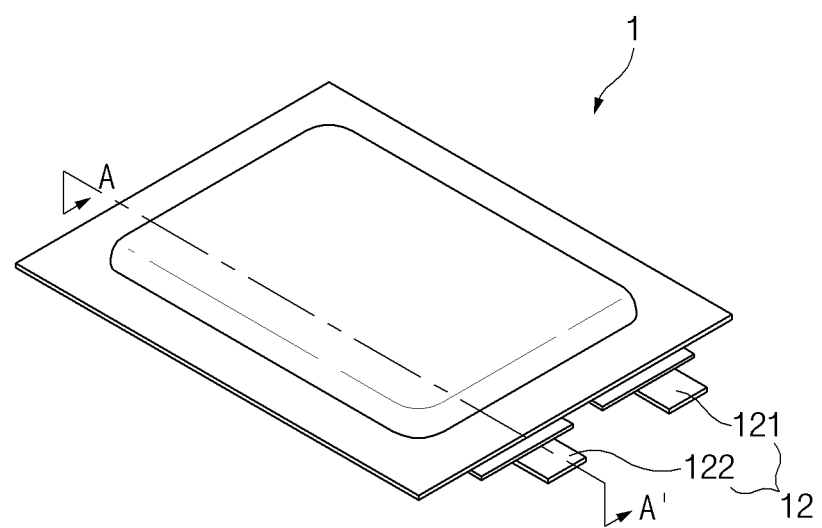
FIG. 2 is a perspective view illustrating a state in which the pouch type secondary battery is completely assembled.

FIG. 1 is an assembled view of a pouch type secondary battery 1 according to an embodiment of the present invention, and FIG. 2 is a perspective view illustrating a state in which the pouch type secondary battery 1 is completely assembled.

In general, in a process of manufacturing a lithium secondary battery, first, slurry in which an electrode active material, a binder, and a plasticizer are mixed with each other is applied to a positive electrode collector and a negative electrode collector to manufacture a positive electrode plate and a negative electrode plate. Thereafter, the negative electrode collector and the positive electrode plate are respectively laminated on both sides of a separator to form an electrode assembly 10 having a predetermined shape, and then, the electrode assembly is inserted into a battery case 13, an electrolyte is injected, and a sealing process is performed.

As illustrated in FIG. 1, the electrode assembly 10 includes an electrode tab 11. The electrode tab 11 is connected to each of a positive electrode and a negative electrode of the electrode assembly 10 to protrude to the outside of the electrode assembly 10, thereby providing a path, through which electrons moves, between the inside and outside of the electrode assembly 10. A collecting plate of the electrode assembly 10 is constituted by a portion coated with an electrode active material and a distal end, on which the electrode active material is not applied, i.e., a non-coating portion. Also, the electrode tab 111 may be formed by cutting the non-coating portion or by connecting a separate conductive member to the non-coating portion through ultrasonic welding. As illustrated in FIG. 1, the electrode tabs 11 may protrude from one side of the electrode assembly 10 in the same direction, but the present invention is not limited thereto. For example, the electrode tabs 11 may protrude in directions different from each other.

In the electrode assembly 10, the electrode lead 12 is connected to the electrode tab 11 through spot welding. The electrode lead 12 according to an embodiment of the present invention is provided in plurality. Also, in the plurality of electrode leads 12, a first electrode lead (see reference numeral 12a of FIG. 4) is connected to the electrode tab 11 of the electrode assembly 10, and a second electrode lead (see reference numeral 12b of FIG. 4) protrudes to the outside of a battery case 13. The first and second electrode leads 12a and 12b will be described below in detail. Also, a portion of the electrode lead 12 is surrounded by an insulation part 14. The insulation part 14 may be disposed to be limited within a sealing part, at which an upper pouch 131 and a lower pouch 132 are thermally fused, so that the electrode lead 12 is bonded to the battery case 13. Also, electricity generated from the electrode assembly 10 may be prevented from flowing to the battery case 13 through the electrode lead 12, and the sealing of the battery case 13 may be maintained. Thus, the insulation part 14 may be made of a nonconductor having non-conductivity, which is not electrically conductive. In general, although an insulation tape which is easily attached to the electrode lead 12 and has a relatively thin thickness is mainly used as the insulation part 14, the present invention is not limited thereto. For example, various members may be used as the insulation part 14 as long as the members are capable of insulating the electrode lead 12.

The electrode lead 12 may extend in the same direction or extend in directions different from each other according to the formation positions of the positive electrode tab 111 and the negative electrode tab 112. The positive electrode lead 121 and the negative electrode lead 122 may be made of materials different from each other. That is, the positive electrode lead 121 may be made of the same material as the positive electrode plate, i.e., an aluminum (Al) material, and the negative electrode lead 122 may be made of the same material as the negative electrode plate, i.e., a copper (Cu) material or a copper material coated with nickel (Ni). Also, a portion of the electrode lead 12, which protrudes to the outside of the battery case 13, may be provided as a terminal part and electrically connected to an external terminal.

In the pouch type secondary battery 1, the battery case 13 may be a pouch made of a flexible material. Also, the battery case 13 accommodates the electrode assembly 10 so that a portion of the electrode lead 12, i.e., the terminal part is exposed and then is sealed. As illustrated in FIG. 1, the battery case 13 includes the upper pouch 131 and the lower pouch 132. A space in which the electrode assembly 10 is accommodated may be provided in the lower pouch 132, and upper pouch 131 may be disposed on the space to cover the space so that the electrode assembly 10 is not separated to the outside of the battery case 13. As illustrated in FIG. 1, the upper pouch 131 and the lower pouch 132 may be separately provided, but the present invention is not limited thereto. For example, the upper pouch 131 and the lower pouch 132 may be manufactured through various manners, that is, one side of the upper pouch 131 and one side of the lower pouch 132 may be connected to each other.

When the electrode lead 12 is connected to the electrode tab 11 of the electrode assembly 10, and the insulation part 14 is provided on a portion of the electrode lead 12, the electrode assembly 10 may be accommodated in the space provided in the lower pouch 132, and the upper pouch 131 may cover an upper portion of the space. Also, when the electrolyte is injected, and the sealing part provided on an edge of each of the upper pouch 131 and the lower pouch 132 is sealed to manufacture the secondary battery 1 as illustrated in FIG. 2.

Figure 3:
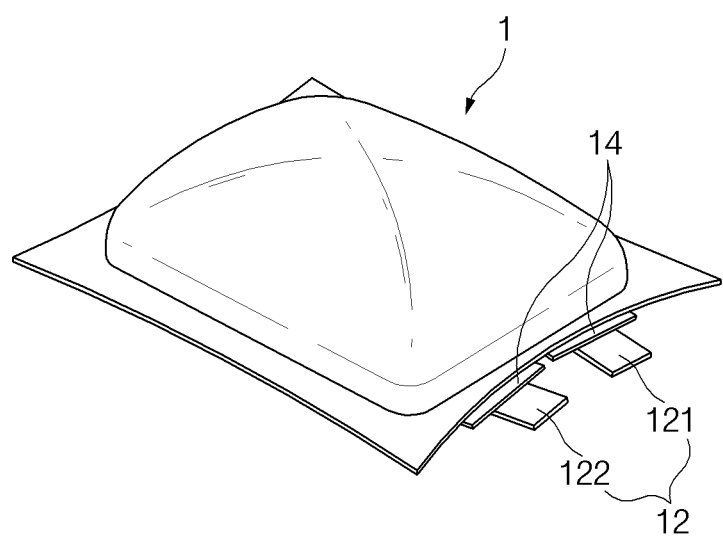
FIG. 3 is a perspective view illustrating a state in which the pouch type secondary battery is expanded in volume according to an embodiment of the present invention.

FIG. 3 is a perspective view illustrating a state in which the pouch type secondary battery 1 is expanded in volume according to an embodiment of the present invention.

The battery case 13 according to an embodiment of the present invention may be preferably a pouch made of a flexible material. Hereinafter, the case in which the battery case 13 is the pouch will be described.

In general, the battery case 13 accommodating the electrode assembly 10 includes a gas barrier layer and a sealant layer. The gas barrier layer blocks introduction and discharge of a gas, and aluminum (Al) foil is mainly used as the gas barrier layer. The sealant layer is disposed in the innermost layer and directly contacts the electrode assembly 10. Also, polypropylene (PP) or the like is mainly used for the sealant layer. Also, a surface protection layer may be further provided on an upper portion of the gas barrier layer. The surface protection layer may be disposed in the outermost layer and cause friction and collision often with the outside. Thus, a nylon resin or PET, which mainly has abrasion resistance and heat resistance, is used for the surface protection layer.

The pouch type battery case 13 may be manufactured by processing a film having the above-described lamination structure into the form of a bag. Thus, when the electrode assembly 10 is accommodated in the pouch type battery case 13, the electrolyte is injected. Thereafter, when the upper pouch 131 and the lower pouch 132 may contact each other, and thermal compression is applied to the sealing part, the sealant layers may be bonded to each other to seal the battery case 13. Here, since the sealant layer directly contacts the electrode assembly 10, the sealant layer may have to have insulating properties. Also, since the sealant contacts the electrolyte, the sealant layer may have to have corrosion resistance. Also, since the inside of the battery case 13 is completely sealed to prevent materials from moving between the inside and outside of the battery case 13, high sealability has to be realized. That is, the sealing part on which the sealant layers are bonded to each other has to have superior thermal bonding strength. In general, a polyolefin-based resin such as polypropylene (PP) or polyethylene (PE) may be used for the sealant layer. Particularly, polypropylene (PP) is excellent in mechanical properties such as tensile strength, rigidity, surface hardness, abrasion resistance, and heat resistance and chemical properties such as corrosion resistance and thus is mainly used for producing the sealant layer.

Generally, in the electrode assembly 10, the charging and discharging are performed by oxidation and reduction reactions. Here, an electrochemical reaction between the electrolyte and the electrode active material generates a gas to some degree. Furthermore, an abnormally more gas may be generated by overcharging or short-circuiting due to an abnormal reaction in the electrode assembly 10. However, since all the respective layers are made of flexible material in the pouch type battery case 13, if the internal pressure of the battery case 13 increases, the pouch type secondary battery 1 is expanded in volume as illustrated in FIG. 3. Recently, techniques in which the electrode lead 12 is provided in plurality to physically interrupt the electrical connection such as interruption of the connection between the plurality of electrode leads 12 when the secondary battery 1 is expanded in volume have been proposed. However, if the connection between the plurality of electrode leads 12 is not completely interrupted, electricity is still produced from the electrode assembly 10, and power is supplied to the outside. Thus, the above problems may not be surely solved.

Figure 4:
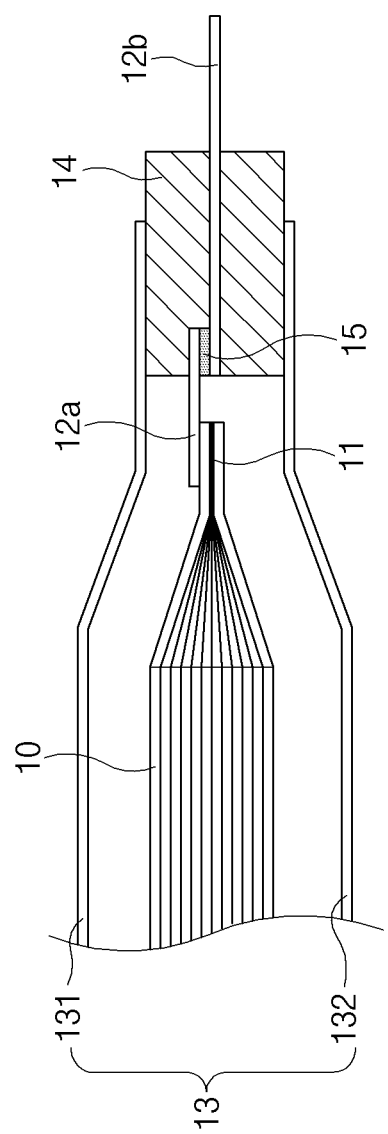
FIG. 4 is a partial cross-sectional view taken along line A-A' of FIG. 2 in the pouch type secondary battery according to an embodiment of the present invention.

FIG. 4 is a partial cross-sectional view taken along line A-A' of FIG. 2 in the pouch type secondary battery 1 according to an embodiment of the present invention.

In the pouch type secondary battery 1 according to an embodiment of the present invention, as illustrated in FIG. 4, the electrode lead 12 is provided in plurality. That is, the electrode lead 12 includes a first electrode lead 12a connected to the electrode tab 11 of the electrode assembly 10 and a second electrode lead 12b protruding to the outside of the battery case 13. Also, one surface of the first electrode lead 12a and one surface of the second electrode lead 12b are bonded to each other through a connection part 15 and thus connected to each other.

The connection part 15 connecting the first and second electrode leads 12a and 12b to each other may have a thin film shape having conductivity. Particularly, it is preferable that the connection part 15 has a very thin thickness of 1 μm to 500 μm. Thus, even though the first and second electrode leads 12a and 12b form a stepped portion therebetween, a size of the stepped portion may not be excessively large, and the electricity generated from the electrode assembly 10 may be easily discharged to the outside. For this, the connection part 15 may be made of a polymer that is a conductive material.

The conductive material may include at least one of: natural or artificial graphite; carbon black such as carbon black, acetylene black, Ketjen black, channel black, furnace black, lamp black, and summer black; conductive fiber such as carbon fiber or metal fiber; metal powders such as carbon fluoride, aluminum, nickel, gold, silver, and copper powder; powder having a core/shell structure coated with a different kind of metal on one kind of metal; conductive whiskey such as zinc oxide and potassium titanate; conductive metal oxide such as titanium oxide; and conductive materials such as polyphenylene derivatives.

The polymer may include at least one of an acrylic resin, an epoxy resin, an ethylene propylene diene monomer (EPDM) resin, a chlorinated polyethylene (CPE) resin, silicone, polyurethane, an urea resin, a melamine resin, a phenol resin, an unsaturated ester resin, polypropylene (PP), polyethylene (PE), polyimide, and polyamide, and most preferably, an acrylic resin.

As described above, a portion of the electrode lead 12 is surrounded by the insulation part 14. In a process of sealing the upper pouch 131 and the lower pouch 132, a relatively high pressure may be applied to a portion contacting the electrode lead 12 to damage the sealant layer of the battery case 13. Since the sealant layer directly contacts the electrode assembly 10 as described above, the sealant layer may have insulating properties. However, if the sealant layer is damaged, the electricity may flows to the battery case 13 through the electrode lead 12. Particularly, since the gas barrier layer of the battery case 13 is made of a metal such as aluminum, if the sealant layer is partially damaged to expose the gas barrier layer, the electricity may easily flow due to the contact with the electrode lead 12.

Thus, the insulation part 14 may be made of a nonconductor having non-conductivity, which is not electrically conductive. Also, the insulation part 14 has high mechanical strength and heat resistance. Thus, when the upper pouch 131 and the lower pouch 132 are thermally fused, the insulation part 14 may be maintained in shape to prevent the electrode lead 12 and the gas barrier layer from contacting each other even through a portion of the sealant layer is damaged. Thus, the electricity generated from the electrode assembly 10 may be prevented from flowing to the battery case 13 through the electrode lead 12. Also, the insulation part 14 has high bonding force. Thus, the insulation part 14 may be disposed to be limited within a sealing part, at which the upper pouch 131 and the lower pouch 132 are thermally fused, so that the electrode lead 12 is bonded to the battery case 13. In general, the insulating portion 14 may be made of at least one of thermoplastic, thermosetting and photo-curable resins having electrical insulation properties as a polymer resin. In general, although an insulation tape which is easily attached to the electrode lead 12 and has a relatively thin thickness is mainly used as the insulation part 14, the present invention is not limited thereto. For example, various members may be used as the insulation part 14 as long as the members are capable of insulating the electrode lead 12.

As illustrated in FIG. 4, the insulation part 14 may surround all of the first electrode lead 12a, the connection part 15, and the second electrode lead 12b. If the first electrode lead 12a or the connection part 15 is not surrounded by the insulation part 14, repulsive force may not be applied to the first electrode lead 12a and the second electrode lead 12b even though the battery case 13 is expanded. The repulsive force will be described below in detail.

As described below, when the battery case 13 is normal, the first and second electrode leads 12a and 12b have to be stably connected to each other. When the secondary battery 13 is expanded, the first and second electrode leads 12a and 12b have to be easily detached from each other. Thus, it is preferable that the first and second electrode leads 12a and 12b are disposed on different planes so that upper and lower surfaces thereof are connected to each other instead that the first and second electrode leads 12a and 12b are disposed on the same plane so that side surfaces thereof are connected to each other. However, as illustrated in FIG. 4, the stepped portion may be provided on the portion at which the first and second electrode leads 12a and 12b are connected to each other, and thus, the bonding force between the insulation part 14 and the electrode lead 12 may be reduced. As a result, to reduce the height of the stepped portion, a step compensation part (see reference numeral 16 of FIG. 8) is provided. The step compensation part 16 will be described below in detail.

Figure 5:
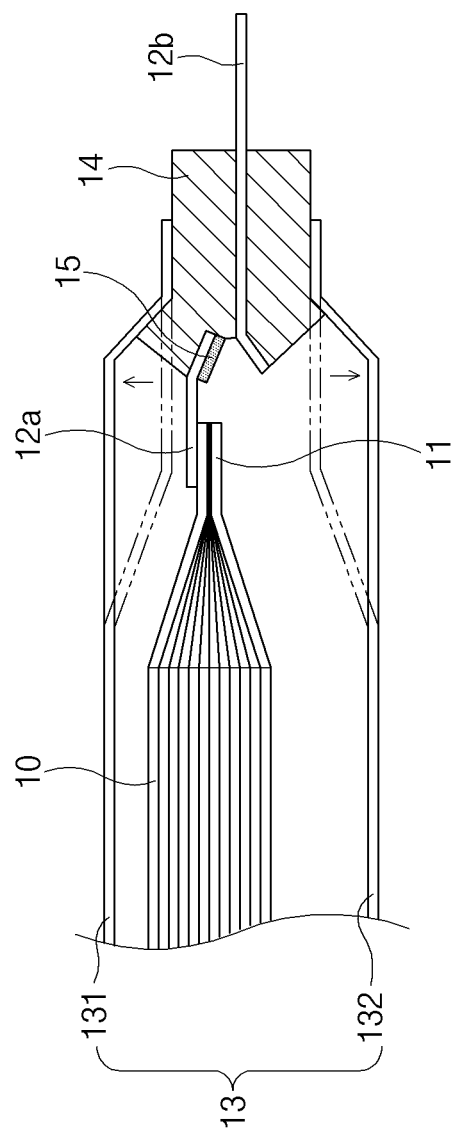
FIG. 5 is a partial cross-sectional view taken along line A-A' of FIG. 2 in the state in which the pouch type secondary battery is expanded in volume according to an embodiment of the present invention.

FIG. 5 is a partial cross-sectional view taken along line A-A' of FIG. 2 in the state in which the pouch type secondary battery is expanded in volume according to an embodiment of the present invention.

As described above, when the internal pressure of the pouch type secondary battery 13 increases, the pouch type secondary battery 1 is expanded in volume. Thus, as illustrated in FIG. 5, an outer wall of the battery case 13 moves outward. Here, upper and lower walls of the outer wall of the battery case 13 may have an area greater than that of the sidewall and be not sealed, resulting in higher flexibility. Thus, the upper wall of the battery case 13 may move upward, and the lower wall of the battery case 13 may move downward.

When the secondary battery 1 is expanded in volume, as illustrated in FIG. 5, the outer wall of the battery case 13 may move outward to apply the repulsive force to the first electrode lead 12a and the second electrode lead 12b through the insulation part 14. Thus, as the internal pressure of the battery case 13 gradually increases, the moving force of the outer wall of the battery case 13 may more increase, and the repulsive force applied to the first electrode lead 12a and the second electrode lead 12b may more increase. When the bonding force between the first electrode lead 12a and the second electrode lead 12b is greater than the repulsive force, as illustrated in FIG. 5, the first electrode lead 12a and the second electrode lead 12b may be detached from each other. Thus, the electrical connection may be interrupted so that the electricity does not flow ever. However, the bonding force between the first and second electrode leads 12a and 12b and the connection part 15 may be less than that between the first and second electrode leads 12a and 12b and the insulation part 14. Thus, when the repulsive force is applied to the first electrode lead 12a and the second electrode lead 12b, the bonding force between the first and second electrode leads 12a and 12b and the insulation part 14 may be maintained to maintain the sealing of the battery case 13, but the first and second electrode leads 12a and 12b may be detached from each other.

According to an embodiment of the present invention, when the internal pressure of the battery case 13 increases, the first electrode lead 12a and the second electrode lead 12b are completely detected from each other. Also, to completely detach the first and second leads 12a and 12b from each other, one end of at least one electrode lead 12 may have a first inclined surface (see reference numeral 17 of FIG. 8). The first inclined surface 17 will be described below in detail.

Figure 6:
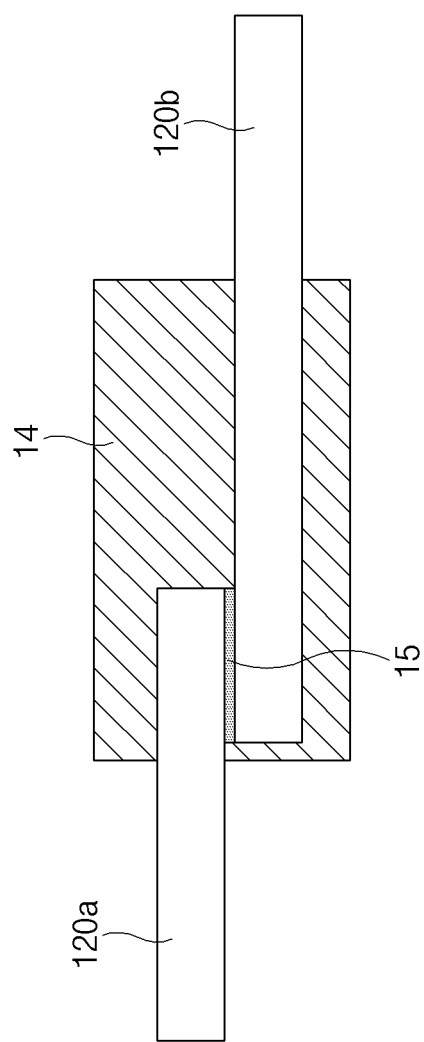
FIG. 6 is an enlarged view of a first electrode lead, a second electrode lead, and a connection part according to the related art in the state of FIG. 4.
Figure 7:
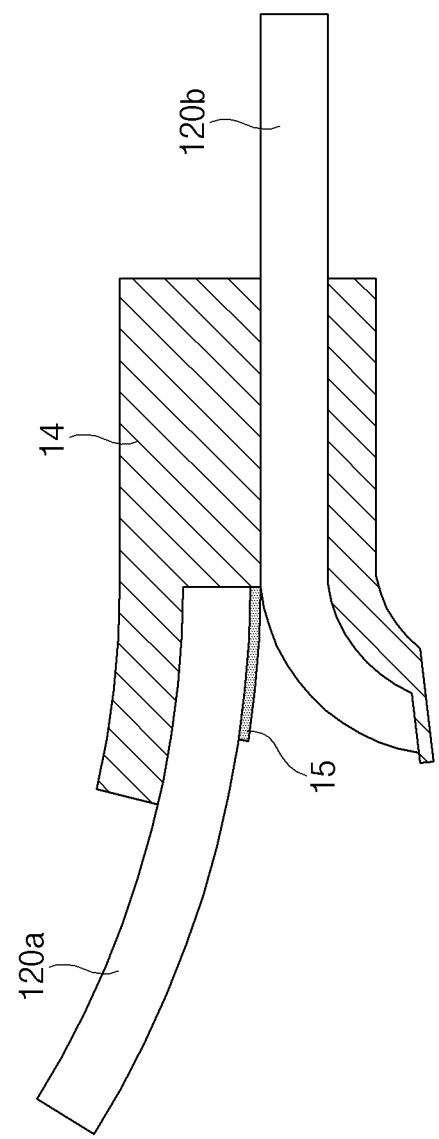
FIG. 7 is an enlarged view of the first electrode lead, the second electrode lead, and the connection part according to the related art in the state of FIG. 5.

FIG. 6 is an enlarged view of a first electrode lead 120a, a second electrode lead 120b, and a connection part 15 according to the related art in the state of FIG. 4, and FIG. 7 is an enlarged view of the first electrode lead 120a, the second electrode lead 120b, and the connection part 15 according to the related art in the state of FIG. 5.

As described above, when a gas is generated in a battery case 13, an internal pressure of a secondary battery 1 may increase to cause weakening of bonding force between components, damage of the case of the secondary battery 1, an early operation of a protection circuit, deformation of an electrode, internal short circuit, explosion, and the like. To solve these problems, the electrode lead 12 includes a first electrode lead 12a connected to an electrode tab 11 of an electrode assembly 10 and a second electrode lead 12b protruding to the outside of the battery case 13. Also, one surface of the first electrode lead 12a and one surface of the second electrode lead 12b are bonded to each other through a connection part 15 and thus connected to each other. Here, the first electrode lead 12a has one end connected to the electrode tab 11 and the other end connected to the second electrode lead 12b. Also, the second electrode lead 12b has one end connected to the outer end of the first electrode lead 12a and the other end protruding to the outside of the battery case 13. Thus, the other end of the first electrode lead 12a and the one end of the second electrode lead 12b are connected to each other through a connection part 15. Also, it is preferable that the first and second electrode leads 12a and 12b are disposed on different planes so that upper and lower surfaces thereof are connected to each other.

However, as illustrated in FIG. 6, an inclined surface is not provided on each of the other end of the first electrode lead 120a and the one end of the second electrode lead 120b, through which the first and second electrode leads 120a and 120b are connected to each other. Thus, when a gas is generated in the battery case 13 to sufficiently expand the battery case 13, the first and second electrode leads 120a and 120b have to be completely detected from each other. However, as illustrated in FIG. 7, the other end of the first electrode lead 120a is still in contact with the second electrode lead 120b. If the connection between the plurality of electrode leads 12 is not completely interrupted, electricity is still produced from the electrode assembly 10, and power is supplied to the outside. Thus, the above problems may not be surely solved.

Figure 8:
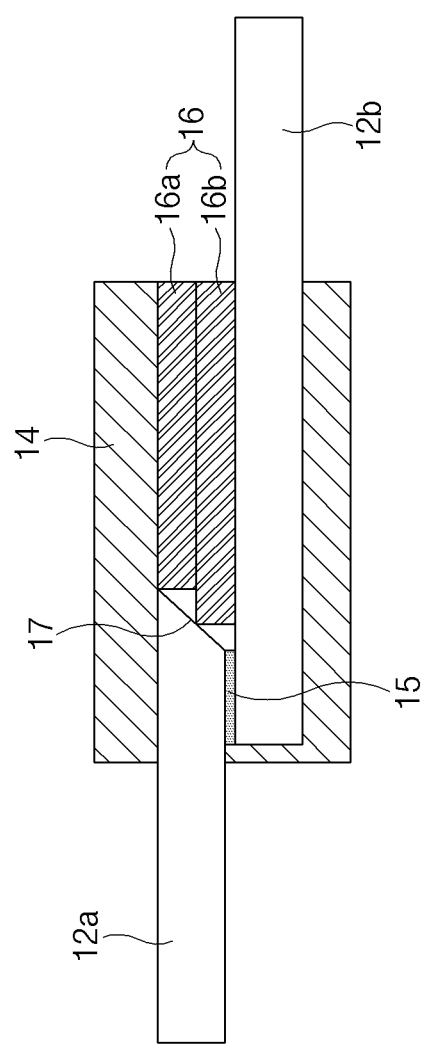
FIG. 8 is an enlarged view of a first electrode lead, a second electrode lead, and a connection part in the state of FIG. 4 according to an embodiment of the present invention.
Figure 9:
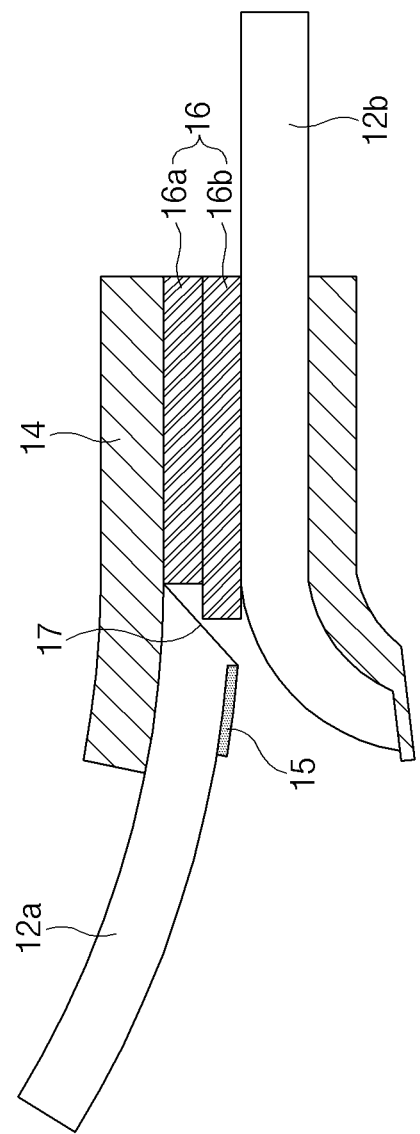
FIG. 9 is an enlarged view of the first electrode lead, the second electrode lead, and the connection part in the state of FIG. 5 according to an embodiment of the present invention.

FIG. 8 is an enlarged view of a first electrode lead 12a, a second electrode lead 12b, and a connection part 15 in the state of FIG. 4 according to an embodiment of the present invention, and FIG. 9 is an enlarged view of the first electrode lead 12a, the second electrode lead 12b, and the connection part 15 in the state of FIG. 5 according to an embodiment of the present invention.

As illustrated in FIG. 8, the other end of the first electrode lead 12a according to an embodiment of the present invention includes a first inclined surface 17. Here, the first inclined surface 17 may have an obtuse angle with respect to the bonding surface on which the first electrode lead 12a is bonded to the first electrode lead 12b through the connection part 15. That is, the bonding surface of the first electrode lead 12a may have a length greater than an opposite surface that is disposed at an opposite side and connected to the insulation part 14. Thus, when the internal pressure of the battery case 13 increases to be expanded, as illustrated in FIG. 9, the second electrode lead 12b may be bent outward to reliably detach the first and second electrode leads 12a and 12b from each other (here, the 'detach' may mean that an adsorbed or attached part is separated). That is, the complete interruption of the electrical connection between the first and second electrode leads 12a and 12b may be secured. On the other hand, an opposite surface of the bonding surface may have a length greater than that of the bonding surface. Thus, the bonding force between the first electrode lead 12a and the insulation part 14 may not be significantly reduced.

As described above, when the battery case 13 is normal, the first and second electrode leads 12a and 12b have to be stably connected to each other to stably supply the electricity generated from the electrode assembly 10 to the outside. On the other hand, when the battery case 13 is expanded, the first and second electrode leads 12a and 12b have to be easily detached from each other to interrupt the electrical connection therebetween. Thus, it is preferable that the first and second electrode leads 12a and 12b are disposed on different planes so that upper and lower surfaces thereof are connected to each other instead that the first and second electrode leads 12a and 12b are disposed on the same plane so that side surfaces thereof are connected to each other.

However, a stepped portion may be provided at a portion, at which the first and second electrode leads 12a and 12b are connected to each other, by a difference in thickness between the first and second electrode leads 12a and 12b even though the connection part 15 has a thin thickness. However, the insulation part 14 may include the portion at which the first and second electrode leads 12a and 12b are connected to each other to surround a portion of the electrode lead 12. Here, the bonding force between the insulation part 14 and the electrode lead 12 may be reduced by the formed stepped portion. As a result, the sealing of the battery case 13 may not be maintained, and thus, the electrolyte injected into the battery case 13 may leak to the outside. To solve this problem, a technique of performing the sealing process twice while surrounding the portion, at which the stepped portion is formed, by the insulation part 14 is proposed. Thus, since the process is performed twice, the process may be cumbersome and increase in number.

Thus, according to an embodiment of the present invention, as illustrated in FIG. 8, to reduce the height of the stepped portion, a step compensation part 16 is provided at a side of the other side of the first electrode lead 12a. When the step compensation part 16 is provided in plurality, all the step compensation parts 16a and 16b are laminated in parallel to each other. Also, the laminated step compensation parts 16 may have a thickness corresponding to the sum of a thickness of the first electrode lead 12a and a thickness of the connection part 15. Here, it is preferable that the correspondence means that the thickness of the step compensation part 16 is the same as the sum of the thickness of the first electrode lead 12a and the thickness of the connection part 15. Also, even though there is some difference in thickness in the process, the correspondence may mean that the difference is within an error range to minimally reduce the height of the stepped portion.

As described above, the step compensation part 16 may be disposed at a side of the other end of the first electrode lead 12a to reduce the height of the stepped portion, thereby reducing the bonding force between the insulation part 14 and the electrode lead 12 without increasing in number of processes.

Here, to prevent a gap from being generated between the step compensation part 16 and the first electrode lead 12a, it is preferable that the step compensation part 16 contacts the other end of the first electrode lead 12a. If the step compensation parts 16a and 16b are provided in plurality, and the first inclined surface 17 is formed on the other end of the first electrode lead 12a, as illustrated in FIG. 8, one end of each of the step compensation parts 16a and 16b contacts the first inclined surface 17 while the step compensation parts 16a and 16b are laminated. Also, the plurality of step compensation parts 16a and 16b may have lengths that gradually increase in an order of the lamination thereof with respect to an inclined angle of the first inclined surface 17. That is, it is preferable that one end of one of the plurality of step compensation parts 16a and 16b protrudes from one end of the other one to form a stepped shape, and all the other ends of the step compensation parts 16a and 16b are disposed on the same plane.

To prevent the electricity transmitted from the first electrode lead 12a from leaking to the outside, it is preferable that the step compensation part 16 is made of a nonconductor having non-conductivity, which is not electrically conductive.

Figure 10:
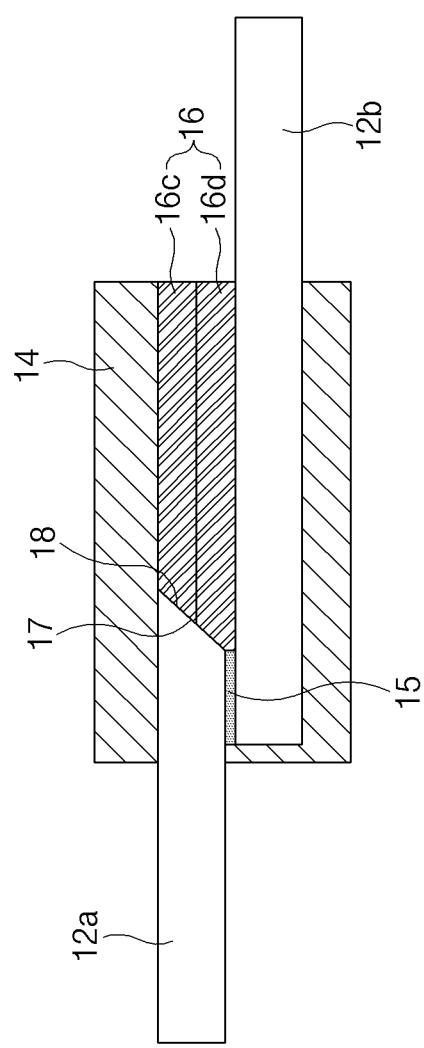
FIG. 10 is an enlarged view of a first electrode lead, a second electrode lead, and a connection part in the state of FIG. 4 according to another embodiment of the present invention.

FIG. 10 is an enlarged view of a first electrode lead 12a, a second electrode lead 12b, and a connection part 15 in the state of FIG. 4 according to another embodiment of the present invention.

Figure 11:
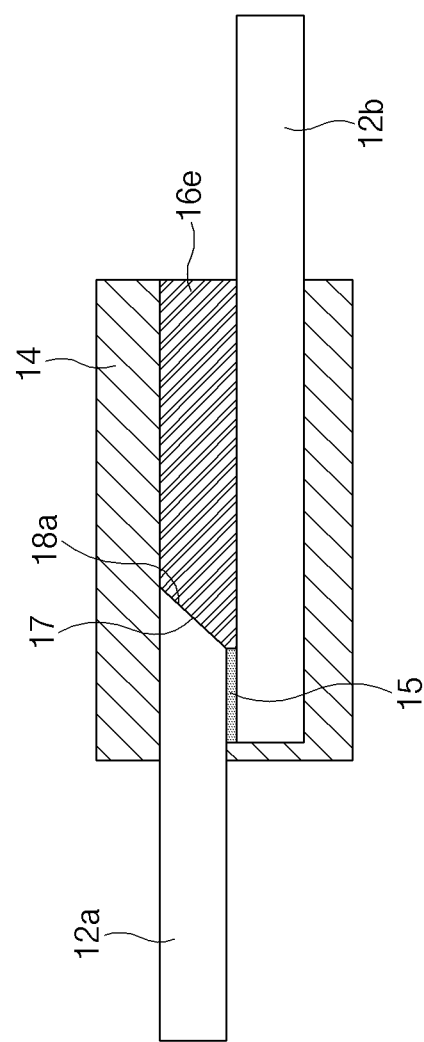
FIG. 11 is an enlarged view of a first electrode lead, a second electrode lead, and a connection part in the state of FIG. 4 according to further another embodiment of the present invention.

The step compensation parts 16a and 16b according to an embodiment of the present invention are provided in plurality so as to be laminated, and an end of each of the step compensation parts 16a and 16b contacts a first inclined surface 17 provided on the other end of the first electrode lead 12a. However, since the inclined surface is not provided on each of the step compensation parts 16a and 16b, in the plurality of step compensation parts 16a and 16b, one end of each of the step compensation parts 16a and 16b further protrudes than the other end to form a stair shape. However, according to another embodiment of the present invention, a second inclined surface 18 is provided on one end of each of a plurality of step compensation parts 16c and 16d. Also, the second inclined surfaces 18 of the step compensation parts 16c and 16d have the same inclined angle, and the inclined angle of each of the second inclined surface 18 corresponds to the inclined angle of the first inclined surface 17. Here, it is preferable that the correspondence means that the inclined angle of the second inclined surface 18 is the same as that of the first inclined surface 17, but the difference is within an error range even though some difference in angle occurs. Thus, as illustrated in FIG. 11, when the step compensation part 16 is disposed on the same plane as the first electrode 12a at a side of the other end of the first electrode lead 12a, it is preferable that the first inclined surface 17 provided on the other end of the first electrode lead 12a and the second inclined surface 18 provided on one end of the step compensation part 16 come into surface contact with each other, but not come into line contact with each other. Thus, even though one end of one of the plurality of step compensation parts 16c and 16d further protrudes than one end of the other of the plurality of step compensation parts 16c and 16d, the second inclined surfaces 18 may have the same plane shape, but do not have the stair shape. Thus, the gap between the first electrode lead 12a and the step compensation part 16 may be more reduced to reduce possibility of separation of the step compensation part 16.

FIG. 11 is an enlarged view of a first electrode lead 12a, a second electrode lead 12b, and a connection part 15 in the state of FIG. 4 according to further another embodiment of the present invention.

A step compensation part 16e according to further another embodiment of the present invention may not be provided in plurality but provided to be integrated as one step compensation part 16e. Thus, since it is unnecessary to perform a process of laminating the step compensation part 16, the number of processes may be reduced. Also, when the second inclined surfaces 18 are provided, since it is unnecessary to adjust the second inclined surfaces 18 to be disposed at the same plane, the manufacturing process may be more simplified, and also, an occurrence of a defect rate may be reduced. That is, according to various embodiments of the present invention, although the step compensation part 16 is provided in plurality, the present invention is not limited thereto. For example, only one step compensation part 16 may be provided.

Figure 12:
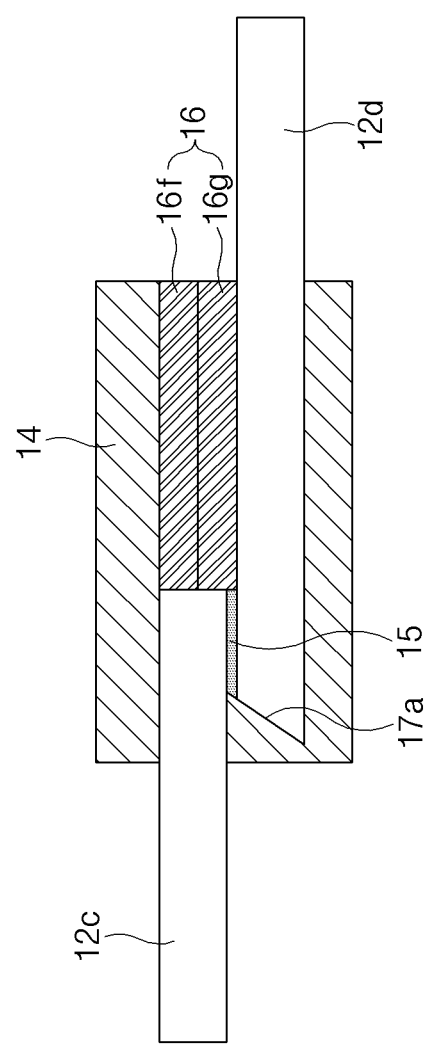
FIG. 12 is an enlarged view of a first electrode lead, a second electrode lead, and a connection part in the state of FIG. 4 according to an additional embodiment of the present invention.

FIG. 12 is an enlarged view of a first electrode lead 12c, a second electrode lead 12d, and a connection part 15 in the state of FIG. 4 according to an additional embodiment of the present invention.

As described above, the other end of the first electrode lead 12a according to an embodiment of the present invention includes the first inclined surface 17. However, according to further another embodiment of the present invention, the first electrode lead 12c does not include the first inclined surface 17a. On the other hand, as illustrated in FIG. 12, one end of the second electrode lead 12d includes the first inclined surface 17a. Here, the first inclined surface 17a may have an obtuse angle with respect to the bonding surface on which the second electrode lead 12d is bonded to the first electrode lead 12c through the connection part 15. That is, the bonding surface of the second electrode lead 12d may have a length greater than an opposite surface that is disposed at an opposite side and connected to the insulation part 14.

When the battery case 13 is expanded, as illustrated in FIG. 9, the second electrode lead 12b is bent outward. However, as illustrated in FIG. 5, the first electrode lead 12a may bent outward. Here, one end of the second electrode lead 12d may include the first inclined surface 17a to more facilitate complete detachment of the first and second electrode leads 12c and 12d.

Furthermore, although not shown, all of the other end of the first electrode lead 12a and one end of the second electrode lead 12b may include the first inclined surfaces 12, respectively. Furthermore, although not shown, all of the other end of the first electrode lead 12a and one end of the second electrode lead 12b may include the first inclined surfaces 12, respectively.

According to further another embodiment of the present invention, since the other end of the first electrode lead 12c does not include the first inclined surface 17a, it is preferable that the second inclined surface 18 is not provided on the step compensation part 16. Thus, as illustrated in FIG. 12, although step compensation parts 16f and 12g are provided in plurality, the plurality of step compensation parts 16f and 16g may have the same length. Thus, one end of each of the plurality of step compensation pats 16f and 16g may contact the other end of the first electrode lead 12c, and thus, the gap may not be generated. As a result, the bonding force between the first electrode lead 12c, the step compensation part 16, and the insulation part 14 may not be deteriorated.

Those with ordinary skill in the technical field of the present invention pertains will be understood that the present invention can be carried out in other specific forms without changing the technical idea or essential features. Therefore, the above-disclosed embodiments are to be considered illustrative and not restrictive. Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. A pouch type secondary battery, comprising:
   an electrode assembly comprising a positive electrode, a separator, and a negative electrode layered such that the separator is between the positive electrode and the negative electrode;
   a battery case having a pouch shape to accommodate the electrode assembly therein;
   an electrode tab connected to the electrode assembly and protruding from one side of the electrode assembly;
   a first electrode lead having one end connected to the electrode tab;
   a second electrode lead having one end connected to the other end of the first electrode lead and the other end protruding to an outside of the battery case;
   a connection part bonding the first electrode lead to the second electrode lead to connect the first and second electrode leads to each other, and
   a step compensation part disposed on a side of the other end of the first electrode lead,
   wherein a first inclined surface is provided on at least one of the other end of the first electrode lead and the one end of the second electrode lead,
   wherein the step compensation part includes a plurality of step compensation parts,
   wherein the first inclined surface is provided on the other end of the first electrode lead, and each of the plurality of step compensation parts has one end contacting the first inclined surface in a state in which the plurality of step compensation parts are laminated, and
   wherein the plurality of step compensation parts increase in length in order of the lamination to correspond to an inclined angle of the first inclined surface.

2. The pouch type secondary battery of claim 1, wherein the step compensation part is integrally provided.

3. The pouch type secondary battery of claim 1, wherein the first inclined surface is provided on the other end of the first electrode lead, and a second inclined surface is provided on one end of the step compensation part.

4. The pouch type secondary battery of claim 3, wherein the second inclined surface has an inclination corresponding to the first inclined surface.

5. The pouch type secondary battery of claim 3, wherein the second inclined surface contacts the first inclined surface.

6. The pouch type secondary battery of claim 1, wherein the step compensation part has non-conductivity is non-conductive.

7. The pouch type secondary battery of claim 1, wherein the step compensation part has a thickness corresponding to the sum of a thickness of the first electrode lead and a thickness of the connection part.

8. The pouch type secondary battery of claim 1, wherein the first inclined surface has an obtuse angle with respect to a bonding surface on which the first electrode lead and the second electrode lead are bonded to each other through the connection part.

9. The pouch type secondary battery of claim 1, further comprising an insulation part surrounding a portion of each of the first and second electrode leads to allow the first and second electrode leads to be bonded to the battery case.

10. The pouch type secondary battery of claim 9, wherein a bonding force between each of the first and second electrode leads and the connection part is less than that between each of the first and second electrode leads and the insulation part.

11. The pouch type secondary battery of claim 9, wherein the insulation part surrounds a portion at which the first and second electrode leads are connected to each other through the connection part.

12. The pouch type secondary battery of claim 9, wherein the insulation part includes at least one of a thermoplastic resin, a thermosetting resin, and a photocurable resin.

13. The pouch type secondary battery of claim 1, wherein the connection part includes a conductive polymer comprising a conductive material.

14. The pouch type secondary battery of claim 1, wherein the connection part has a thickness of 1 μm to 500 μm.

15. A pouch type secondary battery, comprising:
a battery case having a pouch shape;
a first electrode lead having a first end within the battery case;
a second electrode lead having a first end electrically connected to a second end of the first electrode lead and a second end extending outside of the battery case; and
a step compensation part on a side of the second end of the first electrode lead,
wherein a first inclined surface is provided on at least one of the second end of the first electrode lead and the first end of the second electrode lead,
wherein the step compensation part includes a plurality of step compensation parts,
wherein the first inclined surface is provided on the other end of the first electrode lead, and each of the plurality of step compensation parts has one end contacting the first inclined surface in a state in which the plurality of step compensation parts are laminated, and
wherein the plurality of step compensation parts increase in length in order of the lamination to correspond to an inclined angle of the first inclined surface.

16. The pouch type secondary battery of claim 15, wherein the battery case includes a first insulating layer and a second insulating layer configured to seal the battery case around the first and second electrode leads,
wherein the first insulating layer is bonded to the first electrode lead at a location adjacent to the electrical connection between the first and second electrode leads, and
wherein the second insulating layer is bonded to the second electrode lead at a location adjacent to the electrical connection between the first and second electrode leads.

17. The pouch type secondary battery of claim 16, wherein a bonding force between the first electrode lead and the first insulating layer and a bonding force between the second electrode lead and the second insulating layer are each stronger than a bonding force of the electrical connection between the first and second electrode leads.

\* \* \* \* \*